Aug. 19, 1952   J. E. VALENTE   2,607,495
FILTER UNIT

Filed May 3, 1946   2 SHEETS—SHEET 1

INVENTOR
JOHN E. VALENTE

BY Joans, Pond & Anderson

ATTORNEYS

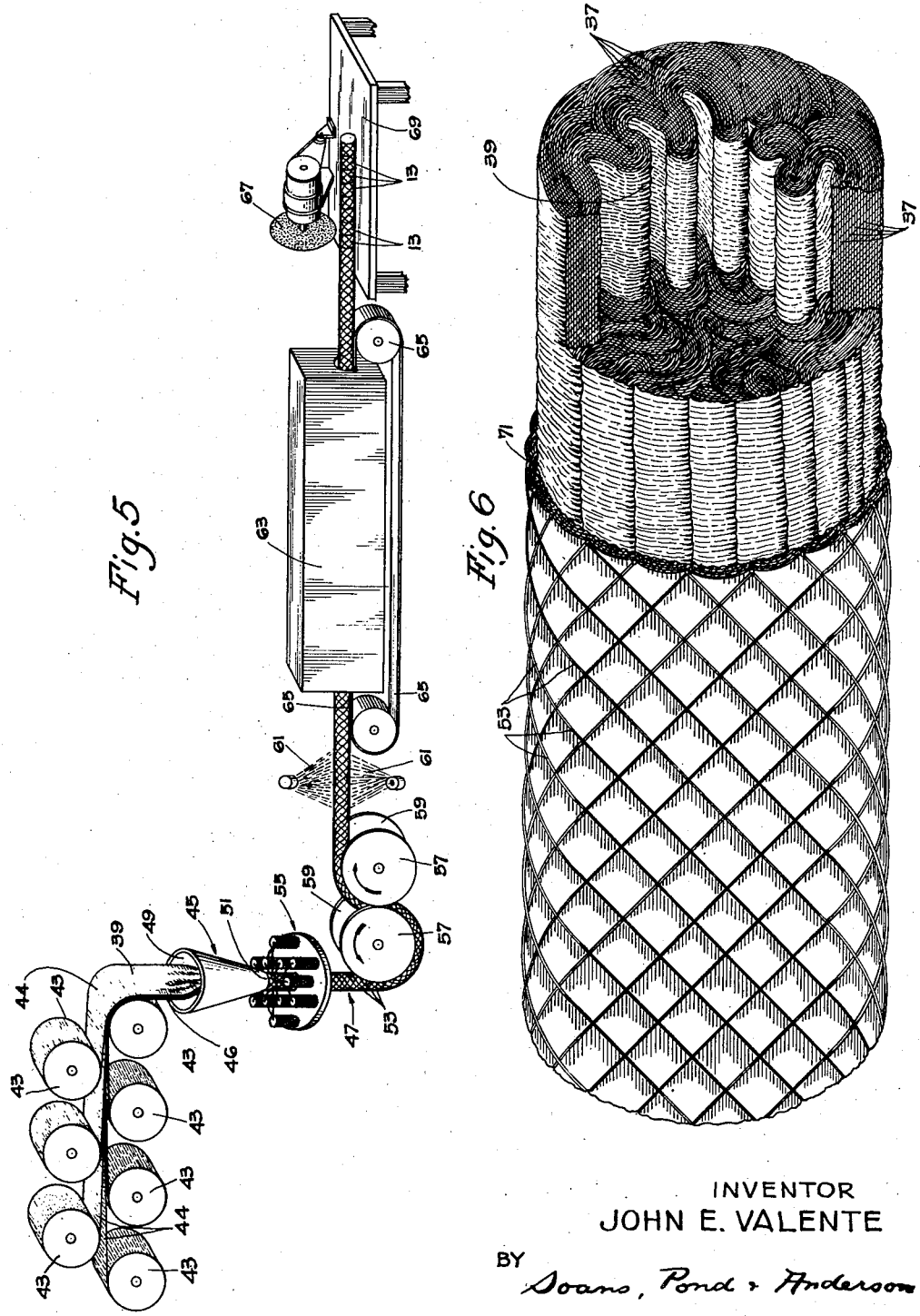

Patented Aug. 19, 1952

2,607,495

UNITED STATES PATENT OFFICE 2,607,495

FILTER UNIT

John E. Valente, Neenah, Wis., assignor to Paper Patents Company, Neenah, Wis., a corporation of Wisconsin Application May 3, 1946, Serial No. 667,190

2 Claims. (Cl. 210—204)

The present invention relates to liquid filtering means and is particularly concerned with replaceable filters for use in filtering lubricating oil and other liquid materials.

It is a well-established fact that the useful life and the operational efficiency of internal-combustion engines can be substantially increased by continuously filtering the oil which is used for lubricating such engines. As a result, various types of oil filters have been proposed and are in use, for this purpose, on automobile and other engines. The usual such filter includes a filtering medium and means for causing the oil or other liquid to flow therethrough at a rate which is consistent with effective filtration. Since the filtering efficiency of most known filtering materials decreases markedly with use, it is highly desirable to renew the filtering material at regular periods of time, and the filtering material in the better filters is embodied into a replaceable unit or cartridge which can be easily removed and renewed as required.

While some of the known devices give reasonably satisfactory results, there are certain deficiencies and disadvantages inherent therein. Most of these result from undesirable physical and operational characteristics of the filtering materials used. Accordingly, the principal object of the present invention is to provide an improved filtering material especially suited for use in lubricating oil and other fluid filters. More specifically, it is an object of my invention to provide an improved filtering material which can be manufactured at low cost, which can be fabricated into a renewable filter unit more readily and more cheaply than previously known materials, and which, in addition, shall have a very long, useful life.

As will hereinafter appear, these objects of the invention are accomplished by the provision of a filtering material and a filter unit which are of novel construction and design. The filtering material and unit of the invention can be manufactured at high speed, and at low cost, by the use of known manufacturing methods and existing machinery. Moreover, the filtering material and unit of the invention is capable of wide application and can be readily adapted for various filtering purposes. The various features and advantages of the invention and the structural details of a renewable cartridge type filter embodying the filtering material and unit of the invention, will be made more apparent in the following description and the accompanying drawings.

In the drawings,

Fig. 5 is a diagrammatic view showing the method employed in the manufacture of one preferred embodiment of a filter element in accordance with the invention; and Fig. 6 is an enlarged, fragmentary view of a filter element manufactured by the apparatus diagrammatically illustrated in Fig. 5.

Figure 1:
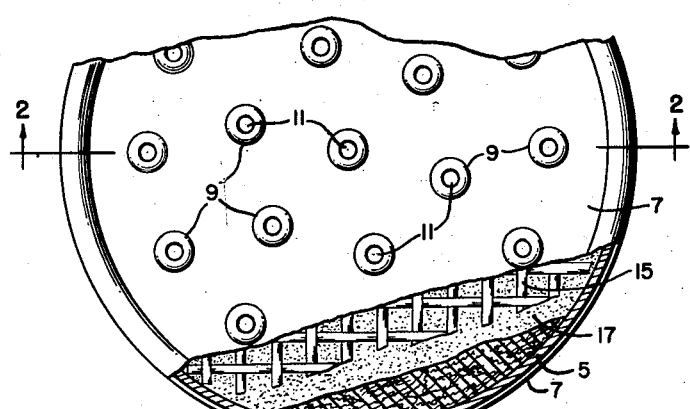
Fig. 1 is a plan view, which is partially cut away and is partially in section, showing a removable filter cartridge embodying a filtering means in accordance with the invention.
Figure 2:
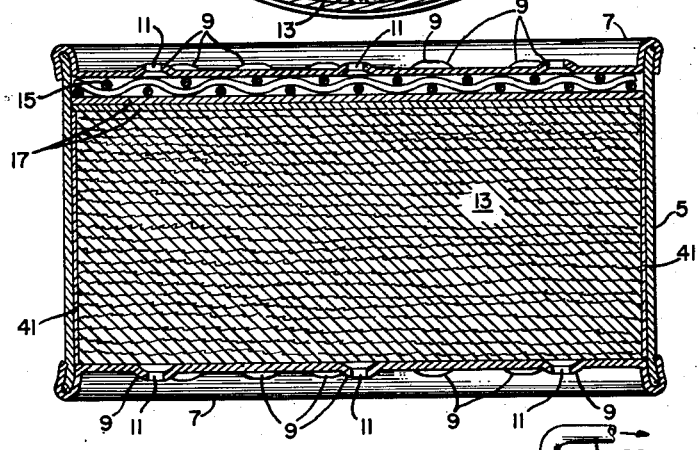
Fig. 2 is a sectional view on the line 2—2 of Fig. 1.

The filter cartridge illustrated in Figs. 1 and 2 includes a main supporting shell, or closure, 5, which conveniently comprises a suitable length of a thin walled, hollow, cylindrical tube which is fabricated of oil-proofed cardboard, a molded plastic, or metal. The ends of the tubular shell 5 are closed by a pair of end caps 7 which are rolled onto, or otherwise permanently attached to, the ends of the tube, as shown. Each of the end caps 7 is provided with a plurality of spaced-apart dimples 9 formed therein by a pressing operation, and a hole 11 is provided centrally of each of the dimples 9 in order that the liquid to be filtered may be conducted through the filter cartridge.

The filter unit or main filter body is illustrated at 13 and comprises a right cylindrical section of filtering material which is of such dimensions that it fits snugly within the outer shell 5 of the cartridge when the end caps 7 are in place thereon. To aid in promoting the free flow of liquids through the filter unit 13, a wire screen 15 of fairly heavy mesh, for example about 12 mesh, is disposed immediately beneath the end cap 7 at the out-flow end of the filter unit 13, and one or more discs 17, cut from a moderate weight, resin impregnated, multi-ply, cellulosic sheet product are disposed between the wire screen 15 and the adjacent end surface of the filter unit 13. The filter discs 17 have the function of removing any extremely fine particles which may be suspended in the oil being filtered. Desirably, the discs 17 are made from a multi-ply sheet product which comprises a plurality of superposed plies of thin, creped, cellulosic tissue, the individual fibres of which are loaded with a thermoset resin, which is of such nature and is present in sufficient amounts to coat and prevent disintegration of the sheet fibres by action of the liquid being filtered, or by some contaminating material which may be contained in that liquid.

For best results, the liquid being filtered should flow through the filter unit 13 before reaching the filter discs 17, i. e. the liquid should flow into the bottom and out of the top of the structure illustrated in Fig. 2. This assures the removal of any very fine particles which may be suspended in the liquid being filtered, and which may pass through the main filter unit 13, and it also accomplishes the removal of any part of the filtering material contained in the filter unit 13 which might have become dislodged.

Figure 4:
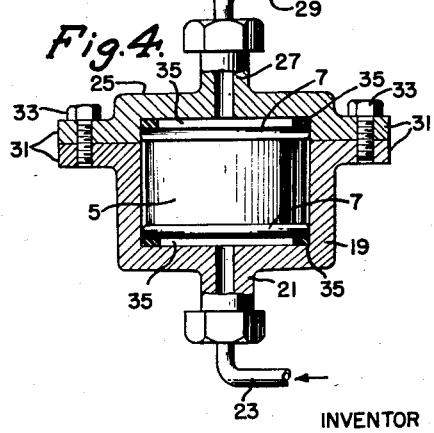
Fig. 4 is a sectional view showing the manner in which the filter cartridge illustrated in Figs. 1 and 2 may be connected into the oil system of a combustion or other type engine.

During use, it is intended that the entire replaceable, filter cartridge shall be contained within a suitable holder which is provided with means for connecting the filter into the oil line, or other liquid filtrate circuit. One exemplary arrangement of this type is shown in Fig. 4. The illustrated device includes a hollow, cup shaped, cylindrical, cartridge holder 19 which is open at the top and which is provided with a connection 21 at the bottom for connecting the filter cartridge into an oil line, or the like, as indicated at 23. The upper end of the filter holder 19 is adapted to be closed by a suitable cover 25 which is provided with a similar central connection 27 for completing the connection to the other end 29 of the oil or other filtrate line. The cover 25 and the holder 19 are provided with cooperating flanges 31 adapted to be held together by cap screw 33, or the like, in conventional manner. To assure that all of the liquid which is pumped or otherwise introduced into the holder shall pass through the filter cartridge, the cooperating parts of the holder are provided with suitable gaskets 35 for engaging the end caps 7 of the filter cartridge closure.

The filter unit 13 is possibly the most important part of the present invention; it constitutes a section or length of a rope-like member which is made by gathering together and compressing a plurality of similarly arranged, superposed sheets of thin, transversely creped, cellulosic tissue or wadding the resultant product being generally similar to the product illustrated and described in the Sackner Patent 1,821,582, which was issued on September 1, 1931. The constituent sheets which make up the rope-like product from which the filter unit 13 is made are drawn through a gathering die or other forming means wherein the sheets are gathered together in irregular convolutions and are compressed in such manner that the creping in these sheets will extend substantially at right angles to the longitudinal axis of the finished product.

Figure 3:
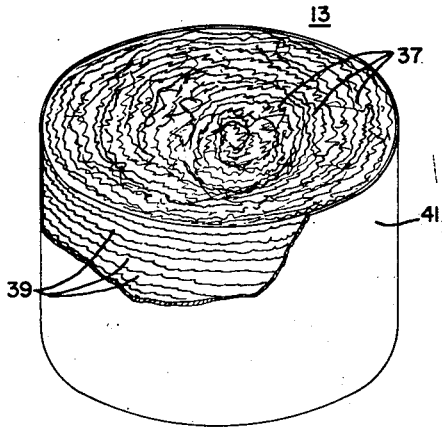
Fig. 3 is a perspective view illustrating the filtering means embodied in the filter cartridge of Figs. 1 and 2.

Liquid flow through the gathered together sheets takes place through flow passageways which extend longitudinally of the filter unit. The flow paths through the filter unit are thus edgewise of the unit and between the constituent sheets, and generally at right angles to the creping therein. Edges of the constituent sheets are indicated at 37 in Figs. 3 and 6 and the creping lines are indicated at 39 in that figure. Conveniently the rope-like product from which the filter unit is made is cylindrical in form, as illustrated, and in order to confine the compressed cellulosic sheets to dimensions and to facilitate handling the product, it is desirable that a wrap of paper, such as is illustrated at 41 in the drawings shall be placed about the gathered together wadding sheets. As an alternative construction, the outer surface of the rope-like product may be sprayed with adhesive, or a starch, or a resin, which will harden to provide a confining layer; a fabric braid can also be used if desired. The filter units 13 are made by cutting off suitable sections of the rope-like product, the length of the sections being determined by the particular requirements of the resulting filter.

One particularly satisfactory method for forming the filter unit 13 is diagrammatically illustrated in Fig. 5. In the illustrated process a plurality of rolls 43 of multi-ply sheets of thin, creped, cellulosic tissue are disposed in such manner that the individual, multi-ply sheets 44 can be drawn from the rolls and brought together in superposed relation as illustrated at 46. The creping lines or crepes 39, in each of the plies of each of the multi-ply sheets 44 are disposed substantially normal to the line of movement of the sheets. The combined multi-ply sheets 46 are fed into a gathering die or consolidating funnel 45, wherein the sheets are mechanically compressed and formed into a rope-like member 47 which has a circular cross section.

The consolidating funnel 45, into which the multi-ply sheets 44 are fed, is in the form of a hollow, truncated cone having its enlarged end 49, disposed to receive the incoming material. As the sheets of tissue move downwardly in the cone, they are gathered together and compressed along the lines of the crepes 39 to a diameter which is small enough to pass outwardly through the smaller or discharge end, 51, of the consolidating funnel 45. At all times during the forming and compressing operation effected by the passage of the multi-ply sheets 44 through the consolidating funnel 45, the various portions of the sheets of cellulosic tissue travel at substantially equal speeds so that the creping lines maintain their positions relative to one another and extend substantially transversely of the line of travel of the material.

The compressed and formed sheets of cellulosic tissue which constitute the rope-like product 47, are maintained in the compressed state by a wrapping of fabric braid 53. This is applied to the compressed sheet product by a braiding machine 55 (Fig. 5). The multi-ply sheets of cellulosic tissue are drawn from the supply rolls 43, through the consolidating funnel 45, and through the braiding machine 55 at a substantially constant speed by means of a pair of pull rolls 57. Each of the pull rolls 57 is fabricated from suitable material and is provided with a concave peripheral groove 59 which is proportioned to engage the rope-like product 47 formed in the consolidating funnel 45. The diameter of the pull rolls 57 should be sufficient to insure that the rope-like product 47 is not damaged by sharp bending. The rolls 57 are driven from a suitable source of power and rotate at a rate of speed which is proportional to the capacity of the consolidating funnel.

After passing through the pull rolls 57 the rope-like product 47 is conducted through a spray of adhesive material as indicated at 61 in Fig. 5. The volume of adhesive sprayed on the surface of the rope-like product 47 is regulated so that the entire outer surface thereof is impregnated. After the rope-like product 47 passes through the spray, it may be conducted into and through a drying oven 63. The drying oven illustrated at 63, includes a feed belt or wire 65 for carrying the rope-like product 47 through the oven. The temperature within the oven is maintained sufficiently high to dry the adhesive; the dried adhesive impregnated layer is indicated at 71 in Fig. 6.

After the adhesive has been set or polymerized, the rope-like product 47 is cut into suitable lengths for use in the filter elements 13. The cutting operation may be accomplished, as illustrated, by a motor driven, high speed rotary knife 67 which is mounted for reciprocating movement upon a suitable table or stand 69. In order to increase the efficiency of the system the oven conveyor 65 can be of the intermittent type so that the rope-like product 47 is advanced through the drying oven 63 in steps. A filter unit 13 then may be cut from the rope-like product 47 each time the conveyor pauses after advancing the material.

Figure 6 shows an enlarged, fragmentary view of the rope-like product 47. In this drawing one of the many possible configurations of the constituent sheets of cellulosic tissue is illustrated, and for the purposes of clarity the lines which indicate the boundaries between each of the constituent, multi-ply sheets have been made slightly heavier than the lines which indicate the individual plies of the constituent sheets. However, in a filter unit in accordance with the invention it is substantially impossible to determine the point at which one sheet begins and the other ends.

The oil being filtered passes through the filter unit 13 in a direction parallel to the central axis of that unit. The lines of the creping 39 extend crosswise of each of the sheets and each of the individual plies 37 and, as shown in the drawings, the crepes lie in planes which are substantially perpendicular to the central axis of the filter element. The oil undergoing filtration thus flows between the layers of multi-ply cellulosic tissue, parallel to the central axis of the unit and crosswise of the creping in the individual sheets. The particular arrangement of the crepes and of the flow passageways embodied in a unit in accordance with the invention, results in an extremely efficient and practical filter element.

In a particularly satisfactory embodiment of the invention used for oil filtering purposes in connection with the automobile gasoline engines, the basic rope-like product from which the edgewise filter units are cut was fabricated by gathering together seven 10-ply sheets of a thin, creped, cellulosic tissue, each sheet having a width of 42 inches. The final product was circular in cross section, having a diameter of 4½ inches, and the filter units comprised 2½ inch sections of the rope-like product. The constituent creped tissue sheets in this embodiment of the invention had a basis weight of about 5.5 pounds for 480 sheets 24 by 36 inches and were made with a crepe ratio of about 2.34. After the gathering and rope-forming operation, the crepe ratio was reduced to about 1.67. The rope product from which the filter units were made had a density of about 10 pounds per cubic foot, the individual filter units weighing approximately 2.27 ounces. The percentage of voids in a unit of this density is within the range of from about 85 to 94 percent.

Measurements indicated that the aggregate flow paths between the constituent sheets of this unit were equivalent to a slot averaging about .004 inch wide and having a length, transversely to the direction of oil flow, of approximately 2900 inches. The length of this equivalent slot in the direction of oil flow which is generally parallel to the surfaces of the constituent sheets was about 4.2 inches, and observations showed that there were about 72 major crepes and 250 minor crepes along the length, in this direction, of each of the constituent sheets making up the filter unit. This filter unit, when embodied into a cartridge of the general type described, was found to have a flow rate with ordinary, S. A. E. 30, lubricating oil, at the usual engine operating temperatures, of approximately one gallon per minute with a pressure drop through the edgewise filter unit of approximately ten pounds per square inch. Since most automotive and other lubricating systems are operated at pressures considerably in excess of this value, the flow rate through the filter is more than adequate.

The filter discs 17 used in this embodiment of the invention were of multi-ply construction and comprised 14 plies of thin, creped, cellulosic tissue having a basis weight of about five to seven pounds for 480 sheets 24 by 36 inches and contained about 60 percent by weight of a thermosetting, phenol formaldehyde resin. The resin was uniformly distributed throughout the sheet and served as a protective covering for the sheet fibers. The filter discs 17, as previously stated, performed the combined functions of filtering out the very fine particles from the oil passing through the filter and, in addition, they prevented any fibers or other material from being carried through the filtering unit proper into the oil system.

Although some variation is permissible in the construction of the fabricated rope-like product which is employed in making filter units of the present invention, it appears that the final product should have a unit density of from about 6.0 to 24 pounds per cubic foot. At densities lower than this, there is the tendency to produce channels through the filter, and at densities in excess of the stated amount, the pressure drop through the filter increases rapidly. By far the best results are obtained with densities of the order of from about 7 to 12 pounds per cubic foot in the finished filter units. The creped, cellulosic sheet material used in the fabrication of the product from which the filter units are made should have a basis weight within the range of from about 3 to 7 pounds for 480 sheets 24 by 36 inches, and the crepe ratio of these sheets, as manufactured, should be of the order of from about 2.0 to 4.0. The constituent, creped cellulosic sheets are desirably made of a high quality furnish, such as bleached sulphite pulp, in order to prevent contamination of the material being filtered.

It will be apparent that filtering units of the type disclosed in the foregoing are capable of rather wide application in the filtering art. The unit may or may not be enclosed within a cartridge, and if a cartridge is used, it need not be of any particular type. The utility of the filter appears to be due primarily to the arrangement of plies and creping, which results in the formation of filter passageways which are equivalent to a single, very long passageway of extremely narrow width. The edgewise arrangement of the constituent creped sheets in the filter unit so as to cause the creping in the sheets to extend substantially at right angles to the path of liquid flow through the filter unit is considered a very important feature of the invention. While particularly suitable for filtering lubricating oil or like materials which contain fine suspended solids, the filtering unit of the invention is equally satisfactory for other types of liquids. The features of the invention, which are believed to be new, are expressly set forth in the accompanying claims.

I claim the following:

1. A filter unit of the class described comprising a plurality of superposed sheets of thin, creped cellulosic tissue, said sheets having a basis weight within the range of from about 3 to 7 pounds for 480 sheets 24 by 36 inches and a crepe ratio when manufactured, of from about 2.0 to 4.0, the crepe lines of said sheets being mutually substantially parallel, said sheets being disposed in irregular convolutions in the direction of said crepe lines and compressed in the direction of said crepe lines to provide a filter body having a unit density within the range of from about 6.0 to 24 pounds per cubic foot, the axes of said convolutions being transverse of said crepe lines, adjacent ones of said sheets defining therebetween tortuous flow passageways extending longitudinally through said filter body substantially parallel to the axes of said convolutions and at substantially right angles to said crepe lines.

2. A filter unit of the class described, comprising a plurality of superposed sheets of thin, creped cellulosic tissue, said sheets having a basis weight within the range of from 3 to 7 pounds for 480 sheets 24 by 36 inches and a crepe ratio, when manufactured, of from about 2.0 to 4.0, the crepe lines of said sheets being mutually substantially parallel, said sheets being disposed in irregular convolutions in the direction of said crepe lines and compressed in the direction of said crepe lines to provide a filter body having a unit density within the range of from about 7 to 12 pounds per cubic foot, the axes of said convolutions being transverse of said crepe lines, adjacent ones of said sheets defining therebetween tortuous flow passageways extending longitudinally through said filter body substantially parallel to the axes of said convolutions and at substantially right angles to said crepe lines.

JOHN E. VALENTE.

REFERENCES CITED

The following references are of record in the file of this patent:

UNITED STATES PATENTS

| Number | Name | Date |
|---|---|---|
| 1,729,135 | Slauson | Sept. 24, 1929 |
| 1,821,582 | Sackner | Sept. 1, 1931 |
| 2,048,350 | McLean | July 31, 1936 |
| 2,076,935 | Burckhalter | Apr. 13, 1937 |
| 2,164,702 | Davidson | July 4, 1939 |
| 2,196,821 | Arnold | Apr. 9, 1940 |
| 2,226,313 | Ehlers | Dec. 16, 1941 |
| 2,292,513 | Fourness et al. | Aug. 11, 1942 |
| 2,347,384 | Winslow et al. | Apr. 25, 1944 |
| 2,380,111 | Kasten | July 10, 1945 |
| 2,386,684 | Hermanson | Oct. 9, 1945 |
| 2,387,714 | Briggs | Oct. 30, 1945 |
| 2,388,668 | Carter | Nov. 13, 1945 |
| 2,413,431 | Briggs | Dec. 31, 1946 |
| 2,421,704 | Kasten | June 3, 1947 |
| 2,468,328 | Hill | Apr. 26, 1949 |